United States Patent
He et al.

(10) Patent No.: US 11,637,324 B2
(45) Date of Patent: Apr. 25, 2023

(54) LITHIUM ION BATTERY ELECTROLYTES AND ELECTROCHEMICAL CELLS INCLUDING THE SAME

(71) Applicant: GM GLOBAL TECHNOLOGY OPERATIONS LLC, Detroit, MI (US)

(72) Inventors: Meinan He, Madison Heights, MI (US); Mei Cai, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 175 days.

(21) Appl. No.: 17/173,708

(22) Filed: Feb. 11, 2021

(65) Prior Publication Data

US 2022/0255132 A1 Aug. 11, 2022

(51) Int. Cl.

| H01M 10/00 | (2006.01) |
| H01M 10/0569 | (2010.01) |
| H01M 10/0525 | (2010.01) |
| H01M 4/505 | (2010.01) |
| H01M 4/525 | (2010.01) |
| H01M 4/587 | (2010.01) |
| H01M 4/02 | (2006.01) |

(52) U.S. Cl.
CPC ....... *H01M 10/0569* (2013.01); *H01M 4/505* (2013.01); *H01M 4/525* (2013.01); *H01M 4/587* (2013.01); *H01M 10/0525* (2013.01); *H01M 2004/027* (2013.01); *H01M 2004/028* (2013.01); *H01M 2300/004* (2013.01); *H01M 2300/0034* (2013.01)

(58) Field of Classification Search
CPC ...... H01M 4/525; H01M 4/505; H01M 4/587; H01M 2300/0034; H01M 2004/028; H01M 2004/027; H01M 2300/004
See application file for complete search history.

(56) References Cited

U.S. PATENT DOCUMENTS

| 8,974,946 B2 | 3/2015 | Cai et al. |
| 9,160,036 B2 | 10/2015 | Yang et al. |
| 9,252,411 B2 | 2/2016 | Abd Elhamid et al. |
| 9,373,829 B2 | 6/2016 | Xiao et al. |
| 9,647,254 B2 | 5/2017 | Dadheech et al. |
| 9,742,028 B2 | 8/2017 | Zhou et al. |
| 9,923,189 B2 | 3/2018 | Xiao |

(Continued)

FOREIGN PATENT DOCUMENTS

| CN | 114927764 A | 8/2022 |
| DE | 102021130784 A1 | 8/2022 |

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrolyte for a lithium ion battery includes a nonaqueous aprotic organic solvent and a lithium salt dissolved in the organic solvent. The organic solvent includes a cyclic carbonate, an acyclic carbonate, and an acyclic fluorinated ether for improved low temperature and high voltage performance as well as enhanced thermostability. The ether group has a general formula of $R_1\text{—}O\text{—}[R_3\text{—}O]_n\text{—}R_2$, where n=0 or 1, $R_1$ and $R_2$ are each straight-chain C1-C6 fluoroalkyl groups, and, when n=1, $R_3$ is a methylene group or a polyethylene group.

19 Claims, 1 Drawing Sheet

(56) References Cited

U.S. PATENT DOCUMENTS

| | | |
|---|---|---|
| 9,929,435 B2 | 3/2018 | Cai et al. |
| 9,979,008 B2 | 5/2018 | Dai et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,224,571 B2 | 3/2019 | Yang et al. |
| 10,312,501 B2 | 6/2019 | Yang et al. |
| 10,326,166 B2 | 6/2019 | Yang et al. |
| 10,347,943 B2 | 7/2019 | Zhang et al. |
| 10,367,201 B2 | 7/2019 | Yang et al. |
| 10,396,360 B2 | 8/2019 | Xiao et al. |
| 10,431,849 B2 | 10/2019 | Yersak et al. |
| 10,446,884 B2 | 10/2019 | Yang et al. |
| 10,483,592 B2 | 11/2019 | Xiao et al. |
| 10,497,927 B2 | 12/2019 | Xiao |
| 10,511,049 B2 | 12/2019 | Yang et al. |
| 10,566,652 B2 | 2/2020 | Dai et al. |
| 10,573,879 B2 | 2/2020 | Yang et al. |
| 10,593,931 B2 | 3/2020 | Adair et al. |
| 10,608,249 B2 | 3/2020 | Liu et al. |
| 10,629,941 B2 | 4/2020 | Dai et al. |
| 10,629,949 B2 | 4/2020 | Yersak et al. |
| 10,734,673 B2 | 8/2020 | Yersak et al. |
| 10,991,946 B2 | 4/2021 | Xiao et al. |
| 11,101,501 B2 | 8/2021 | Liu et al. |
| 11,183,714 B2 | 11/2021 | Yang et al. |
| 2013/0330609 A1* | 12/2013 | Sawa ............... H01M 10/0525 429/188 |
| 2015/0056387 A1 | 2/2015 | Dadheech et al. |
| 2015/0056493 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0076485 A1* | 3/2018 | Zhang ............... H01M 10/0568 |
| 2020/0328475 A1* | 10/2020 | Hakari ............. H01M 10/0567 |
| 2022/0093972 A1 | 3/2022 | Hakari et al. |

* cited by examiner

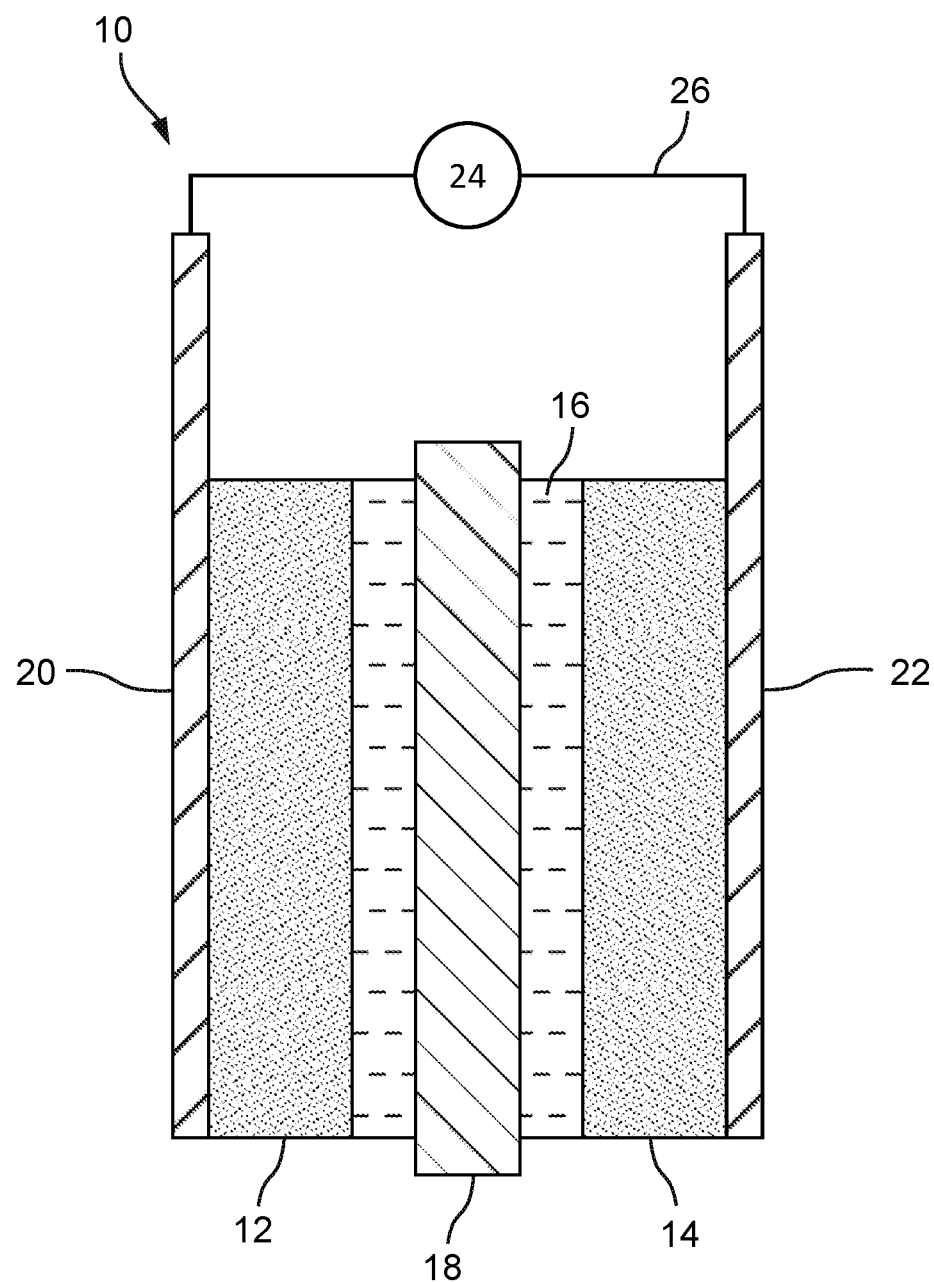

LITHIUM ION BATTERY ELECTROLYTES AND ELECTROCHEMICAL CELLS INCLUDING THE SAME

INTRODUCTION

The present invention relates to lithium ion batteries and, more particularly, to nonaqueous, aprotic liquid electrolytes for lithium ion batteries.

Electrochemical cells of secondary lithium ion batteries generally include a negative electrode and a positive electrode spaced apart from one another by a porous separator. The negative and positive electrodes and the porous separator are infiltrated with an ionically conductive electrolyte that provides a medium for the conduction of lithium ions between the negative and positive electrodes during discharge and recharge of the electrochemical cell. Electrolytes of lithium ion batteries generally comprise a lithium salt dissolved or dispersed in one or more aprotic organic solvents and may be formulated to exhibit certain desirable properties over a wide operating temperature range (e.g., −20° C. to 60° C.). Such desirable properties may include high ionic conductivity, high dielectric constant (correlated with a higher ability to dissolve salts), low viscosity, adequate coordination behavior with lithium salts, and chemical compatibility with the other components of the electrochemical cell. For example, the organic solvent may be formulated to promote the effective and reversible solvation of the lithium salt in the organic solvent to avoid cointercalation of organic solvent molecules in the layered structure of the negative electrode along with the lithium ions during battery recharge.

Electrolytes of lithium ion batteries may be formulated to promote the in situ formation of an electrically insulating and ionically conductive layer oftentimes referred to as a solid electrolyte interphase (SEI) on the surface of the negative electrode at an interface between the negative electrode and the electrolyte during the initial charge of the batteries. The formation of a native SEI on the surface of the negative electrode may help prevent further physical contact and undesirable side reactions from occurring between the lithium metal of the negative electrode and the electrolyte during operation of the battery. In addition, the native SEI may help ensure the even distribution and deposition of lithium ions on the negative electrode during battery recharge, which may help prevent lithium dendrite nucleation and growth on the negative electrode.

To increase the capacity of lithium ion batteries, positive electrode materials have been developed that exhibit high working voltages (e.g., >4.4V vs. Li/Li+), which may be outside the electrochemical (oxidative) stability window of some organic solvents currently used in commercial lithium ion battery electrolytes. To effectively incorporate these new high voltage positive electrode materials into commercial lithium ion batteries, organic solvents or co-solvents may be formulated to increase the oxidative stability of the electrolytes, while also maintaining their high ionic conductivity.

SUMMARY

An electrolyte for a lithium ion battery is disclosed. The electrolyte may comprise a nonaqueous aprotic organic solvent and a lithium salt dissolved or ionized in the organic solvent. The organic solvent may include a cyclic carbonate, an acyclic carbonate, and an acyclic fluorinated ether. The acyclic fluorinated ether may have the formula:

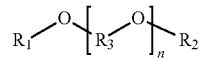

wherein n=0 or 1, wherein $R_1$ and $R_2$ are each straight-chain C1-C6 fluoroalkyl groups, and wherein, when n=1, $R_3$ is a methylene group or a polyethylene group.

The total number of carbon atoms in the acyclic fluorinated ether may be 2, 3, 4, 5, 6, or 7.

Where n=0, $R_1$ may be a perfluoromethyl group or a perfluoroethyl group and $R_2$ may be a perfluoromethyl group or a perfluoroethyl group.

Where n=1, $R_1$ and $R_2$ may each be perfluoroethyl groups and $R_3$ may be an ethylene group.

The acyclic fluorinated ether may account for, by volume, 5-50% of the organic solvent.

The cyclic carbonate may be at least one of ethylene carbonate, fluoroethylene carbonate, difluoro ethylene carbonate, or 3,3,3-trifluoropropylene carbonate. The acyclic carbonate may be at least one of diethyl carbonate, dimethyl carbonate, or ethyl methyl carbonate.

The lithium salt may comprise at least one of $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiC_2F_6NO_4S_2$, and/or $LiPF_6$.

The organic solvent may be substantially free of propylene carbonate.

An electrochemical cell for a lithium ion battery is disclosed. The electrochemical cell may comprise a negative electrode, a positive electrode spaced apart from the negative electrode, and an electrolyte infiltrating the pores of the negative and positive electrodes. The negative electrode may be made of a graphite-based material. The positive electrode may include at least one transition metal oxide that can undergo the reversible intercalation of lithium ions. The electrolyte may include a nonaqueous aprotic organic solvent and a lithium salt dissolved or ionized in the organic solvent. The organic solvent may include a cyclic carbonate, an acyclic carbonate, and an acyclic fluorinated ether. The acyclic fluorinated ether may have the formula:

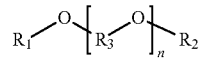

wherein n=0 or 1, wherein $R_1$ and $R_2$ are each straight-chain C1-C6 fluoroalkyl groups, and wherein, when n=1, $R_3$ is a methylene group or a polyethylene group. The total number of carbon atoms in the acyclic fluorinated ether may be 2, 3, 4, 5, 6, or 7.

Where n=0, $R_1$ may be a perfluoromethyl group or a perfluoroethyl group and $R_2$ may be a perfluoromethyl group or a perfluoroethyl group. In such case, the acyclic fluorinated ether may be a chemical compound represented by one or more of:

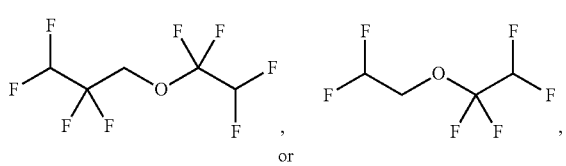

or

-continued

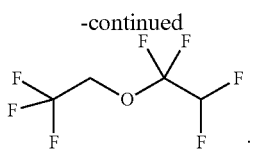

Where n=1, $R_1$ and $R_2$ each may be perfluoroethyl groups and $R_3$ may be an ethylene group. In such case, the acyclic fluorinated ether may be a chemical compound represented by the formula:

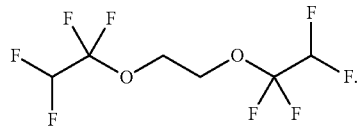 [SMILES: FC(F)C(F)(F)OCCOC(F)(F)C(F)F]

The acyclic fluorinated ether may account for, by volume, 5-50% of the organic solvent.

Lithium ions dissolved in the organic solvent may not coordinate or form complexes with the acyclic fluorinated ether.

The cyclic carbonate may be at least one of ethylene carbonate, fluoroethylene carbonate, difluoro ethylene carbonate, or 3,3,3-trifluoropropylene carbonate. The acyclic carbonate may comprise at least one of diethyl carbonate, dimethyl carbonate, or ethyl methyl carbonate.

The lithium salt may comprise at least one of $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiC_2F_6NO_4S_2$, and/or $LiPF_6$.

The negative electrode may comprise, by weight, greater than 50% graphite, and the positive electrode may comprise, by weight, greater than 50% layered lithium-nickel-cobalt-manganese oxide.

The acyclic fluorinated ether may account for, by volume, 5-25% of the organic solvent, the cyclic carbonate may account for, by volume, 10-40% of the organic solvent, and the acyclic carbonate may account for, by volume, 60-80% of the organic solvent. The acyclic fluorinated ether, the cyclic carbonate, and the acyclic carbonate may account for, by volume, 100% of the organic solvent.

The organic solvent may be substantially free of propylene carbonate, vinylene carbonate, and ethylene sulfate.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a schematic side cross-sectional view of an electrochemical cell of a secondary lithium ion battery.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed electrolytes are formulated to include a co-solvent of an acyclic fluorinated ether in combination with certain cyclic and acyclic carbonate-based organic solvents and may be used in electrochemical cells of lithium ion batteries to allow for the effective operation of such batteries at ambient temperature and at relatively low temperatures (e.g., <−20° C.), while also improving the capacity retention thereof, as compared to electrolytes that require the addition of propylene carbonate (PC) to achieve effective low temperature operation. The capacity retention and cycle life of lithium ion batteries incorporating the presently disclosed electrolytes can be improved, for example, by avoiding cointercalation of organic solvent molecules in the structure of graphite-based negative electrode materials, which has been found to occur when electrolytes include propylene carbonate as an organic solvent to facilitate low temperature operation. In addition, the acyclic fluorinated ether in the presently disclosed electrolytes may help improve the oxidative stability of the electrolytes, for example, by inhibiting oxidation of the carbonate-based organic solvents in the electrolyte during high voltage operation and in embodiments where the electrolytes are used in lithium ion batteries that include positive electrode materials with high discharge voltages (e.g., >4.4V vs. Li/Li+), such as high-nickel content lithium nickel cobalt manganese oxide (NCM) positive electrode materials, to achieve higher energy densities. Furthermore, the acyclic fluorinated ether in the presently disclosed electrolytes may help improve the thermodynamic stability of the presently disclosed electrolytes, for example, by increasing the flash point of the electrolytes. These and other benefits will be readily appreciated by those of ordinary skill in the art in view of the following disclosure.

FIG. 1 depicts a schematic side cross-sectional view of an electrochemical cell 10 that may be combined with one or more additional electrochemical cells to form a secondary battery, such as a lithium ion battery. The electrochemical cell 10 includes a positive electrode 12, a negative electrode 14 spaced apart from the positive electrode 12, an ionically conductive liquid electrolyte 16 that provides a medium for the conduction of lithium ions between the positive electrode 12 and the negative electrode 14, and a porous separator 18 that electrically isolates the positive and negative electrodes 12, 14 from each other while allowing lithium ions to pass therethrough. The positive electrode 12 is disposed on a major surface of a positive electrode current collector 20, and the negative electrode 14 is disposed on a major surface of a negative electrode current collector 22. In practice, the positive and negative electrode current collectors 20, 22 may be electrically coupled to a power source or load 24 via an external circuit 26.

The electrolyte 16 infiltrates the pores of the positive and negative electrodes 12, 14 and the porous separator 18 and is formulated to facilitate the transport of lithium ions between the positive and negative electrodes 12, 14 over a wide range of operating temperatures (e.g., −30° C. to 60° C.), while also inhibiting undesirable side reactions between the electrolyte 16 and the other components of the electrochemical cell 10. The electrolyte 16 comprises a nonaqueous aprotic organic solvent and a lithium salt dissolved or ionized in the organic solvent. The organic solvent includes a cyclic carbonate, an acyclic carbonate, and an acyclic fluorinated ether.

The composition of the acyclic fluorinated ether of the electrolyte 16 may be represented by the following chemical formula:

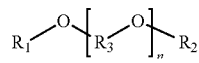

(1)

wherein n=0 or 1. $R_1$ and $R_2$ are each straight-chain C1-C6 fluoroalkyl groups. $R_3$ may be a methylene group (—$CH_2$—) or a polyethylene group ((—$CH_2$—$CH_2$—)$_m$), wherein m=1. The total number of carbon atoms in the acyclic fluorinated ether may be 2, 3, 4, 5, 6, or 7.

In the acyclic fluorinated ether of formula (1), one or both of the straight-chain C1-C6 fluoroalkyl groups may be polyfluoroalkyl groups, wherein at least one hydrogen ion ($H^+$), but less than all of the hydrogen ions, on the carbon chain have been substituted with fluorine ions ($F^+$). In embodiments, one or both of the straight-chain C1-C6 fluoroalkyl groups may be perfluoroalkyl groups, wherein all of the hydrogen ions ($H^+$) on the carbon chain have been substituted with fluorine ions ($F^+$). Examples of C1-C6 fluoroalkyl groups include fluorinated methyl (—$CH_3$), ethyl (—$CH_2CH_3$), propyl (—$CH_2CH_2CH_3$), butyl (—$CH_2CH_2CH_2CH_3$), pentyl (—$CH_2CH_2CH_2CH_2CH_3$), and hexyl (—$CH_2CH_2CH_2CH_2CH_2CH_3$) groups.

In embodiments where n=0, $R_1$ may be a straight-chain C1-C6 polyfluoroalkyl group and $R_2$ may be a straight-chain C1-C6 polyfluoroalkyl group. For example, $R_1$ may be a tetrafluoropropyl group and $R_2$ may be a tetrafluoroethyl group. In such case, the acyclic fluorinated ether may be 2,2,3,3-tetrafluoro-1-(1,1,2,2-tetrafluoroethoxy)propane (CAS No. 16627-68-2, m.p. −56° C.) and may be represented by the following chemical formula:

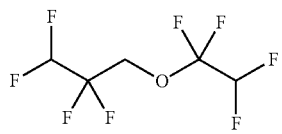

(2)

As another example, $R_1$ may be a difluoroethyl group and $R_2$ may be a tetrafluoroethyl group. In such case, the acyclic fluorinated ether may be 1-(2,2-difluoroethoxy)-1,1,2,2-tetrafluoroethane (CAS No. 50807-77-7) and may be represented by the following chemical formula:

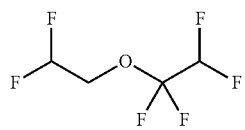

(3)

As another example, $R_1$ may be a trifluoroethyl group and $R_2$ may be a tetrafluoroethyl group. In such case, the acyclic fluorinated ether may be 1,1,2,2-tetrafluoro-1-(2,2,2-trifluoroethoxy)ethane (m.p. −91° C.) and may be represented by the following chemical formula:

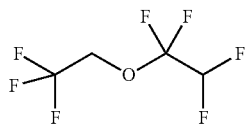

(4)

In embodiments where n=1, $R_1$ may be a straight-chain C1-C6 polyfluoroalkyl group and $R_2$ may be a straight-chain C1-C6 polyfluoroalkyl group. For example, $R_1$ may be a tetrafluoroethyl group, $R_2$ may be a tetrafluoroethyl group, and $R_3$ may be a polyethylene group. In such case, the acyclic fluorinated ether may be 1,2-bis(1,1,2,2-tetrafluoroethoxy)ethane (f p. −45° C.) and may be represented by the following chemical formula:

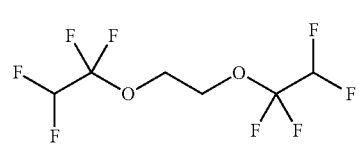

(5)

The acyclic fluorinated ether may be referred to as a co-solvent, meaning that the acyclic fluorinated ether may not facilitate ionization or transport of lithium ions through the electrolyte 16, but may be included in the organic solvent for the purpose of imparting certain other desirable properties to the electrolyte 16. For example, the acyclic fluorinated ether may help improve the oxidative stability of the electrolyte 16 by inhibiting oxidation of the cyclic carbonate and the acyclic carbonate in the organic solvent of the electrolyte 16 during high voltage charging conditions. High oxidative stability of the electrolyte 16 also may be beneficial in embodiments where the electrolyte 16 are used in a lithium ion battery that includes a positive electrode 12 having a high discharge voltages (e.g., >4.4V vs. Li/Li+). Without intending to be bound by theory, it is believed that the fluorine (F) atoms on the acyclic fluorinated ether may provide the electrolyte 16 with improved oxidative stability (as compared to carbonate-based organic solvents that do not contain fluorinated ethers) due to the high electronegativity of fluorine (the highest of all elements). Elements with high electronegativity, such as fluorine, exhibit a strong attraction to shared electrons in a covalent bond, in this case, the fluorine atoms on the acyclic fluorinated ether may be strongly attracted to and may act as an "electron withdrawing group" with respect to the shared electrons on the cyclic carbonate and the acyclic carbonate in the organic solvent of the electrolyte 16. This may have a deactivating effect on the carbonates in the organic solvent, making them less susceptible to oxidation (loss of electrons) in high voltage environments.

The acyclic fluorinated ether may exhibit a melting point of less than −20° C., preferably less than −40° C., and more preferably less than −50° C. and may provide the electrolyte 16 with a suitable viscosity and ionic conductivity at relatively low operating temperatures.

The acyclic fluorinated ether in the electrolyte 16 may eliminate the need for the addition or inclusion of propylene carbonate in the electrolyte 16, which may be required in carbonate-based electrolytes that do not contain fluorinated ethers in order to provide such electrolytes with suitable viscosity and ionic conductivity at relatively low operating temperatures. As such, the presently disclosed electrolyte 16 may be substantially free of propylene carbonate. For example, propylene carbonate may account for, by volume, less than 5%, preferably less than 2%, and more preferably less than 1% of the electrolyte 16. As used herein, the term "substantially" does not exclude "completely." For example, a composition which is "substantially free" from Y may be completely free from Y.

Without intending to be bound by theory, it is believed that, when propylene carbonate is included in the electrolyte of lithium ion batteries, propylene carbonate molecules may coordinate with lithium ions ($Li^+$) in the electrolyte during solvation of the lithium salt, and, when the lithium ions are subsequently intercalated into the material of the negative electrode 14 during battery charging, the propylene carbonate molecules may cointercalate with the lithium ions, resulting in mechanical degradation of the negative electrode 14 structure. To help mitigate cointercalation of propylene carbonate molecules in the structure of the negative electrode 14, vinylene carbonate (VC) and/or ethylene sulfate (DTD) are sometimes included in electrolytes of lithium ion batteries. Without intending to be bound by theory, it is believed that the presently disclosed acyclic fluorinated ethers in the electrolyte 16 do not coordinate with or form complexes with lithium ions in the electrolyte 16 during solvation of the lithium salt, and thus do not present a risk of damaging the structure of the negative electrode 14 due to the cointercalation of organic solvent molecules with lithium ions in the negative electrode 14. Therefore, additive included in propylene carbonate-containing electrolytes to mitigate cointercalation of propylene carbonate molecules are not required in the presently disclosed electrolyte 16, and thus the presently disclosed electrolyte 16 may be substantially free of vinylene carbonate and/or ethylene sulfate. For example, vinylene carbonate and/or ethylene sulfate may account for, by volume, less than 5%, preferably less than 2%, and more preferably less than 1% of the electrolyte 16.

The acyclic fluorinated ether may exhibit a flash point of greater than 30° C., preferably greater than 45° C., and more preferably greater than 55° C. and may provide the electrolyte 16 with high thermal stability, for example, by reducing the flammability of the electrolyte 16.

The acyclic fluorinated ether may account for, by volume, 5-50% of the organic solvent, preferably 5-25% of the organic solvent, and more preferably 8-12% of the organic solvent.

The cyclic carbonate may be selected to facilitate ionization of the lithium salt in the electrolyte 16, as well as formation of a solid electrolyte interphase (SEI) on the surface of the negative electrode 14 at an interface between the negative electrode 14 and the electrolyte 16 during the initial charge of the electrochemical cell 10. In embodiments, the cyclic carbonate may comprise at least one of ethylene carbonate, fluoroethylene carbonate, difluoro ethylene carbonate, or 3,3,3-trifluoropropylene carbonate For example, the cyclic carbonate may consist essentially of ethylene carbonate (EC) having a melting point of less than 37° C. and a flash point of greater than about 150° C. The cyclic carbonate may account for, by volume, 5-50% of the organic solvent, preferably 10-40% of the organic solvent, and more preferably 20-30% of the organic solvent.

The acyclic carbonate may be selected to facilitate ionization of the lithium salt in the electrolyte 16 and to provide the electrolyte 16 with suitable viscosity at low operating temperatures. In embodiments, the acyclic carbonate may comprise diethyl carbonate (DEC, m.p. <45° C., f.p. ~33° C.), dimethyl carbonate (DMC, m.p. <4° C., f. p. ~17° C.), ethyl methyl carbonate (EMC, m.p. <−14° C., f.p. >26° C.), or a combination thereof. The acyclic carbonate may account for, by volume, 50-90% of the organic solvent, preferably 60-80% of the organic solvent, and more preferably 65-75% of the organic solvent.

The lithium salt may comprise $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiC_2F_6NO_4S_2$, $LiPF_6$, or a combination thereof. The lithium salt may be present in the organic solvent at a concentration in a range of 0.5 M to 2 M, preferably in a range of 0.8 M to 1.6 M, and more preferably in a range of 1.1 M to 1.3 M, or about 1.2 M.

The porous separator 18 is configured to physically separate the positive electrode 12 and the negative electrode 14 from one another while permitting lithium ions to pass therethrough. The porous separator 18 exhibits an open microporous structure and may comprise an organic and/or inorganic material that can physically separate and electrically insulate the positive and negative electrodes 12, 14 from each other while permitting the free flow of ions therebetween. The porous separator 18 may comprise a non-woven material, e.g., a manufactured sheet, web, or mat of directionally or randomly oriented fibers. The porous separator 18 may comprise a microporous polymeric material, e.g., a microporous polyolefin-based membrane or film. For example, the porous separator 18 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 18 may comprise a laminate of one or more polymeric materials, such as a laminate of PE and PP. The porous separator 18 may have a thickness in the range of 5 µm to 30 µm and a porosity in a range of 25% to 75%.

The positive electrode 12 is porous and may comprise one or more electrochemically active materials that can undergo a reversible redox reaction with lithium, e.g., a material that can sufficiently undergo lithium intercalation and deintercalation, alloying and dealloying, or plating and stripping. In one form, the positive electrode 12 may comprise an intercalation host material that can undergo the reversible insertion or intercalation of lithium ions. In such case, the intercalation host material of the positive electrode 12 may comprise a layered oxide represented by the formula $LiMeO_2$, an olivine-type oxide represented by the formula $LiMePO_4$, a spinel-type oxide represented by the formula $LiMe_2O_4$, a favorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode material 12 may comprise a conversion material including a component that can undergo a reversible electrochemical reaction with lithium, in which the component undergoes a phase change or a change in crystalline structure accompanied by a change in oxidation state. In such case, the conversion material of the positive electrode 12 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode 12 include iron, manganese, nickel, copper, and cobalt.

In some embodiments, the positive electrode 12 may include an electrochemically active material in the form of a layered high-nickel content lithium nickel cobalt manganese oxide ($LiNiCoMnO_2$ or NCM). In such case, the nickel (Ni), cobalt (Co), and manganese (Mn) may be present in the electrochemically active material at a ratio of 6-8:1-2:1-2.

In embodiments, the electrochemically active material of the positive electrode 12 may be intermingled with a polymeric binder to provide the positive electrode 12 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode 12 optionally may include particles of an electrically conductive material, which may comprise very fine particles of, for example, high-surface area carbon black. The electrochemically active material(s) may account for, by weight, 50-90% of the positive electrode 12, the polymeric binder may account for, by weight, 5-30% of the positive electrode 12, and the electrically conductive material may account for, by weight, 5-40% of the positive electrode 12.

The negative electrode 14 is porous and may comprise one or more electrochemically active materials that can undergo the reversible insertion or intercalation of lithium ions at a lower electrochemical potential than the electrochemically active materials of the positive electrode 12 such that an electrochemical potential difference exists between the positive and negative electrodes 12, 14. In embodiments, the electrochemically active material of the negative electrode 14 may comprise a graphite-based material. The term "graphite-based," as used herein with respect to the electrochemically active material of the negative electrode 14, broadly includes materials in which graphite is the single largest constituent on a weight percentage (%) basis. This may include materials having, by weight, greater than 50% graphite, as well as those having, by weight, less than 50% graphite, so long as graphite is the single largest constituent of the material. In addition to graphite, the electrochemically active material of the negative electrode 14 may comprise at least one of lithium, silicon, tin oxide, aluminum, indium, zinc, germanium, silicon oxide (silica), titanium oxide, and/or lithium titanate. The same polymeric binder materials (PVdF, EPDM, SBR, CMC, polyacrylic acid) and electrically conductive particles (high-surface area carbon black) used in the positive electrode 12 also may be intermingled with the electrochemically active material(s) of the negative electrode 14 for the same purposes. The electrochemically active material(s) may account for, by weight, 50-90% of the negative electrode 14, the polymeric binder may account for, by weight, 5-30% of the negative electrode 14, and the electrically conductive material may account for, by weight, 5-40% of the negative electrode 14.

The positive and negative electrode current collectors 20, 22 may comprise a material (e.g., a metal or a metal alloy) that can collect and reversibly passing free electrons to and from their respective electrode 12, 14. For example, the positive and negative electrode current collectors 20, 22 may comprise an electrically conductive metal, e.g., a transition metal or alloy thereof. In embodiments, the negative electrode current collector 22 may comprise copper, nickel, an iron alloy (e.g., stainless steel), or titanium, and the positive electrode current collector 20 may comprise aluminum, nickel, or an iron alloy (e.g., stainless steel). Other electrically conductive metals may of course be used, if desired.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. An electrolyte for a lithium ion battery, the electrolyte comprising:
    a nonaqueous aprotic organic solvent comprising a cyclic carbonate, an acyclic carbonate, and an acyclic fluorinated ether; and
    a lithium salt dissolved or ionized in the organic solvent,
    wherein the cyclic carbonate accounts for, by volume, 10-40% of the organic solvent, the acyclic carbonate accounts for, by volume, 60-80% of the organic solvent, and the acyclic fluorinated ether accounts for, by volume, 5-25% of the organic solvent,
    wherein the acyclic fluorinated ether is represented by the formula:

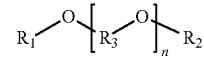

where n=0 or 1,
   where $R_1$ and $R_2$ are each straight-chain C1-C6 fluoroalkyl groups, and
   where, when n=1, $R_3$ is a methylene group or a polyethylene group, and
   wherein the organic solvent is substantially free of propylene carbonate.

2. The electrolyte of claim 1 wherein the total number of carbon atoms in the acyclic fluorinated ether is 2, 3, 4, 5, 6, or 7.

3. The electrolyte of claim 1 wherein n=0, wherein $R_1$ is a perfluoromethyl group or a perfluoroethyl group, and wherein $R_2$ is a perfluoromethyl group or a perfluoroethyl group.

4. The electrolyte of claim 1 wherein n=1, $R_1$ and $R_2$ are each perfluoroethyl groups, and $R_3$ is an ethylene group.

5. The electrolyte of claim 1 wherein the cyclic carbonate consists of at least one of ethylene carbonate, fluoroethylene carbonate, and difluoro ethylene carbonate, and wherein the acyclic carbonate consists of at least one of diethyl carbonate, dimethyl carbonate, and ethyl methyl carbonate.

6. The electrolyte of claim 1 wherein the lithium salt comprises at least one of $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiC_2F_6NO_4S_2$, and/or $LiPF_6$.

7. The electrolyte of claim 1 wherein the acyclic fluorinated ether, the cyclic carbonate, and the acyclic carbonate account for, by volume, 100% of the organic solvent.

8. An electrochemical cell comprising:
    a negative electrode made of a graphite-based material;
    a positive electrode spaced apart from the negative electrode, the positive electrode including at least one transition metal oxide that can undergo the reversible intercalation of lithium ions; and
    an electrolyte infiltrating pores of the negative and positive electrodes, the electrolyte including:
        a nonaqueous aprotic organic solvent comprising a cyclic carbonate, an acyclic carbonate, and an acyclic fluorinated ether; and
        a lithium salt dissolved or ionized in the organic solvent, wherein the acyclic fluorinated ether is represented by the formula:

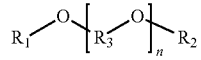

where n=0 or 1,
where $R_1$ and $R_2$ are each straight-chain C1-C6 fluoroalkyl groups,
where, when n=1, $R_3$ is a methylene group or a polyethylene group, and
where the total number of carbon atoms in the acyclic fluorinated ether is 2, 3, 4, 5, 6, or 7, and
wherein the organic solvent is substantially free of propylene carbonate.

9. The electrochemical cell of claim 8 wherein n=0, wherein $R_1$ is a perfluoromethyl group or a perfluoroethyl group, and wherein $R_2$ is a perfluoromethyl group or a perfluoroethyl group.

10. The electrochemical cell of claim 9 wherein the acyclic fluorinated ether is a chemical compound represented by one or more of:

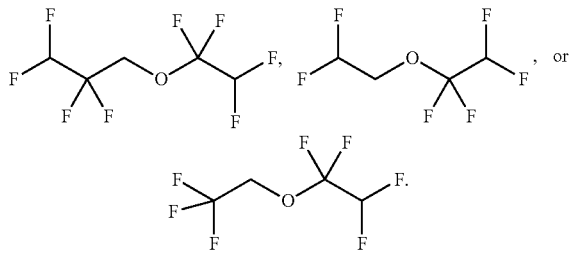

11. The electrochemical cell of claim 8 wherein n=1, $R_1$ and $R_2$ are each perfluoroethyl groups, and $R_3$ is an ethylene group.

12. The electrochemical cell of claim 11 wherein the acyclic fluorinated ether is a chemical compound represented by the formula:

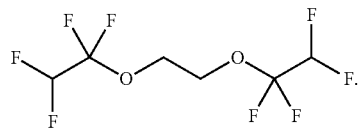 [SMILES: FC(F)C(F)(F)OCCOC(F)(F)C(F)F]

13. The electrochemical cell of claim 8 wherein lithium ions dissolved in the organic solvent do not coordinate or form complexes with the acyclic fluorinated ether.

14. The electrochemical cell of claim 8 wherein the cyclic carbonate is at least one of ethylene carbonate, fluoroethylene carbonate, difluoro ethylene carbonate, or 3,3,3-trifluoropropylene carbonate, and wherein the acyclic carbonate is at least one of diethyl carbonate, dimethyl carbonate, or ethyl methyl carbonate.

15. The electrochemical cell of claim 8 wherein the lithium salt comprises at least one of $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiC_2F_6NO_4S_2$, and/or $LiPF_6$.

16. The electrochemical cell of claim 8 wherein the negative electrode comprises, by weight, greater than 50% graphite, and wherein the positive electrode comprises, by weight, greater than 50% layered lithium-nickel-cobalt-manganese oxide.

17. The electrochemical cell of claim 8 wherein the acyclic fluorinated ether, the cyclic carbonate, and the acyclic carbonate account for, by volume, 100% of the organic solvent.

18. The electrochemical cell of claim 8 wherein the organic solvent is substantially free of vinylene carbonate and ethylene sulfate.

19. The electrolyte of claim 1 wherein the acyclic fluorinated ether comprises at least one of 2,2,3,3-tetrafluoro-1-(1,1,2,2-tetrafluoroethoxy)propane; 1-(2,2-difluoroethoxy)-1,1,2,2-tetrafluoroethane; 1,1,2,2-tetrafluoro-1-(2,2,2-trifluoroethoxy)ethane; and 1,2-bis(1,1,2,2-tetrafluoroethoxy)ethane.

* * * * *